United States Patent Office.

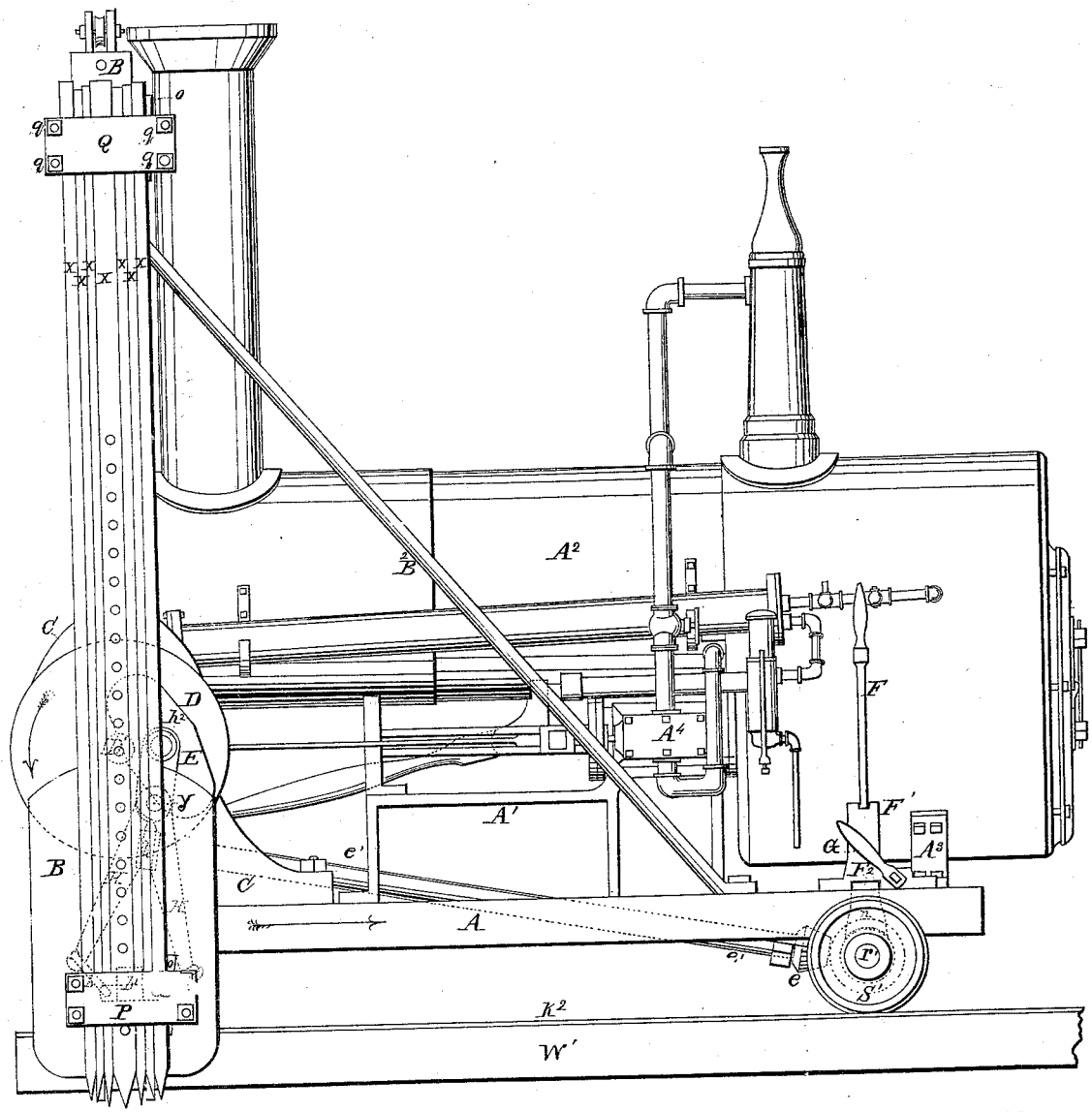

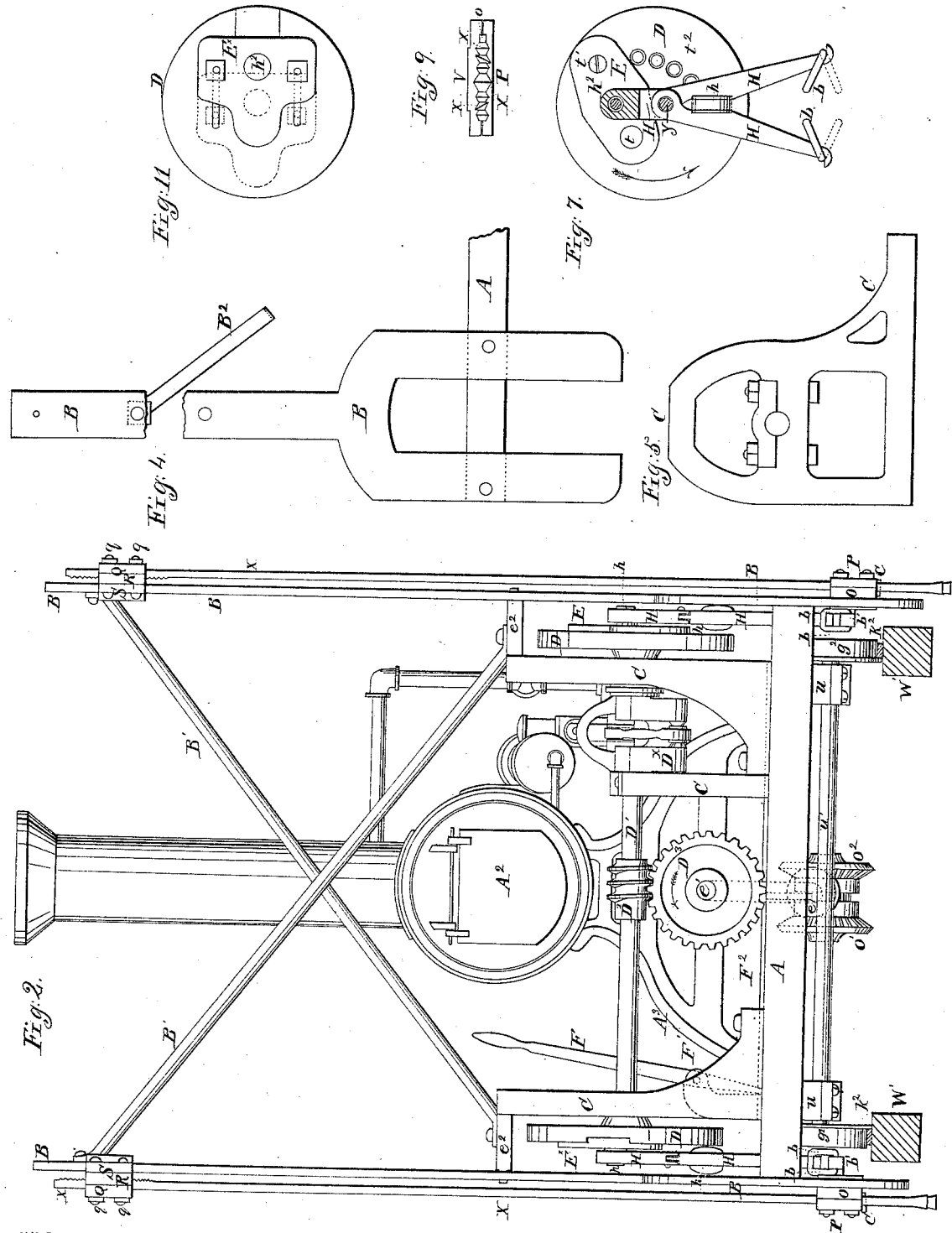

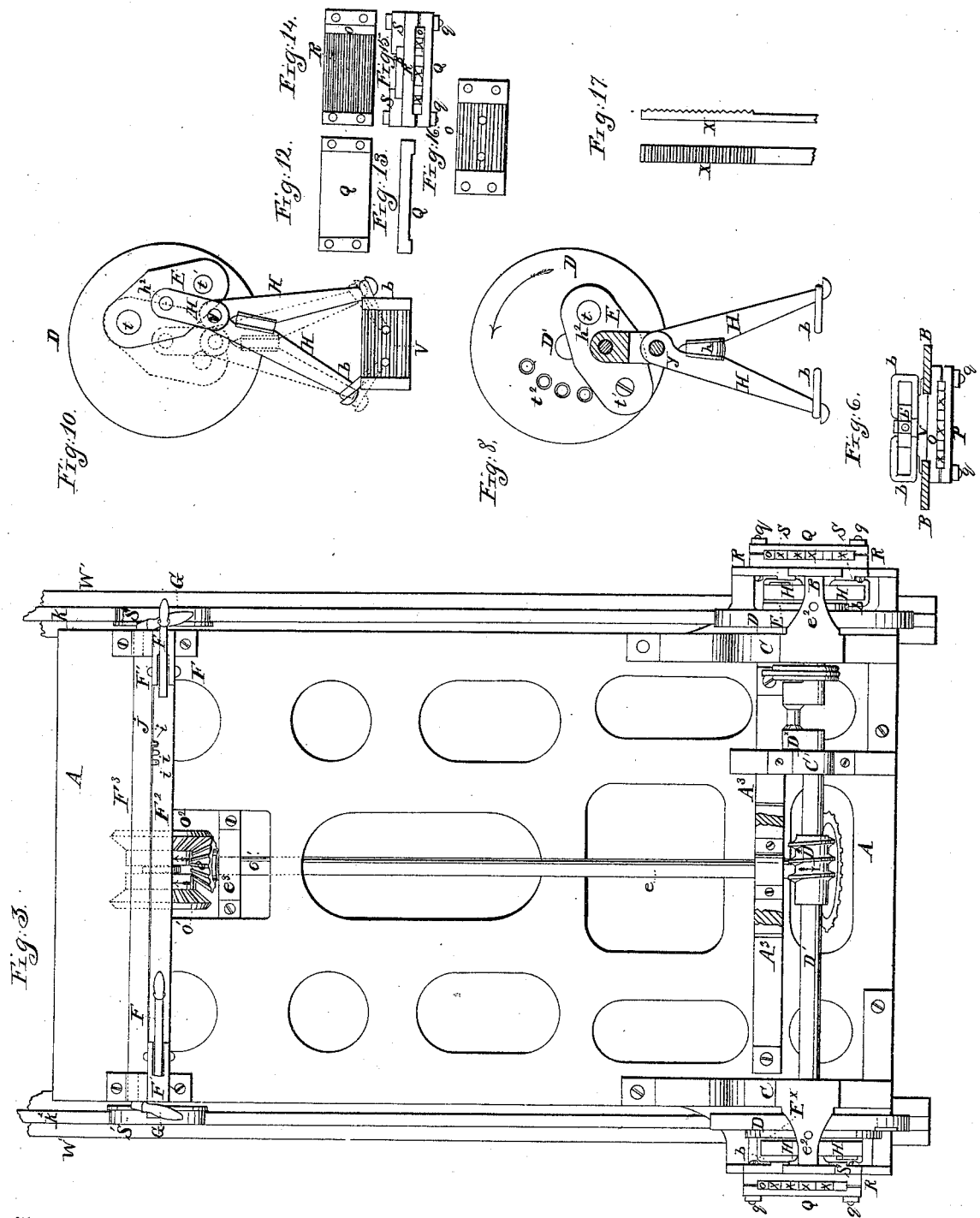

GEORGE J. WARDWELL, OF RUTLAND, VERMONT, ASSIGNOR TO STEAM STONE CUTTER COMPANY.

Letters Patent No. 90,325, dated May 18, 1869; antedated January 30, 1869.

---

IMPROVEMENT IN STONE-CHANNELLING MACHINERY.

---

The Schedule referred to in these Letters Patent and making part of the same.

---

*To all whom it may concern:*

Be it known that I, GEORGE J. WARDWELL, of Rutland, in the county of Rutland, and State of Vermont, have invented certain new and useful Improvements in Stone-Channelling Machinery; and I do hereby declare that the following is a full, clear, and exact description thereof, reference being had to the accompanying drawings, making a part of this specification, in which—

Figure 1, plate 1, is an elevation of one side of the improved machine, as it appears when mounted upon a track, ready for operation.

Figure 2, plate 2, is an elevation of the front of the machine, representing one gang of cutters in the act of ascending, and the other gang in the act of descending.

Figure 3, plate 3, is a top view of the bed of the machine, the channelling and feeding-devices, as seen by removing the steam-boiler, and engines.

Figure 4, plate 4, shows one of the cutter-standards in detail.

Figure 5, plate 4, is a side view of one of the bearings of the crank-shaft.

Figures 6, 7, 8, 9, 10, 11, 12, 13, 14, 15, 16, 17, plate 4, are views in detail of the cutting-devices, and the parts which connect such devices to the crank-shaft.

Similar letters of reference indicate corresponding parts in the several figures.

This invention relates to certain novel improvements, which are generally applicable to machinery for producing channels or kerfs in the beds of stone quarries, preparatory to cutting under and removing large stones therefrom.

It relates particularly to improvements on the stone-quarrying machinery for which Letters Patent of the United States were granted to me, bearing date respectively, on the 10th day of November, 1863, on the 28th day of November, 1865, and on the 24th day of September, 1867.

One object of my invention is to improve the means hitherto used for operating the channelling-cutters of stone-quarrying machinery, by connecting the gangs of reciprocating chisels to a crank-shaft, that receives motion directly from an engine mounted upon the cutter-carrying carriage, by means of yielding-arms or rods, constructed and applied in such manner that the shocks and concussions incident to the operation of cutting channels in stone, shall not be communicated to the machinery which is used to support, guide, and operate said cutters or chisels, as will be hereinafter described.

Another object is to provide for varying the length of strokes and striking-force of the chisels, according to the kind of stone which is to be cut; and also to provide for so adjusting the crank-pins of the arms which connect the gangs of cutters to their crank-shaft, that when it is desired to stop the movements of either one of the gangs, it can be done without disconnecting such gang from its crank-pin or connecting-arms, as will be hereinafter explained.

Another object of my invention is to utilize the crank-shaft of the engine for operating one or two gangs of chisels, and also for communicating a forward or backward feed-motion to the carriage upon its track, and to employ, in combination therewith, shifting-gearing and certain adjusting and locking-devices therefor, which will enable the attendant, stationed on either side of the machine, to reverse or stop the movements of the carriage at pleasure, as will be hereinafter explained.

Another object is to provide for guiding and directing one or more gangs of cutters applied to a carriage, by means of forked standards, which will afford upper and lower guides for the cutters, and admit of their being conveniently applied to or detached from the machine, and which will allow the cutters to be worked very close to the side of the track upon which the machine is moved.

To enable others skilled in the art to understand my invention, I will describe its construction and operation.

In the accompanying drawings—

A represents the bed of the carriage or truck-frame, which I prefer to construct of bars and plates of wrought-iron, united together in a substantial manner.

$S^1$ $S^1$ are the two rear transporting-wheels, which are keyed upon an axle, $r^1$, and $g^2$ $g^2$ are the front wheels, which are keyed to an axle, $u^1$.

These wheels are flanged like car-wheels, and adapted for travelling upon rails $k^2$ $k^2$, which are suitably secured to sleepers $W^1$ $W^1$.

The axle $r^1$ of the rear wheels has two bevel-wheels $O^1$ $O^2$, applied near the middle of its length, and fastened to the ends of a short hub, which hub has an annular groove made in its circumference, for receiving a tooth, $n$, that depends from a slide, $F^2$, arranged transversely across the top of the bed A.

The hub of wheels $O^1$ $O^2$ is applied upon the axle $r^1$, by means of a key-tenon, so that while these wheels and hub will be carried around with this axle, they may be adjusted endwise thereon, by giving corresponding movements to the slide $F^2$.

This slide $F^2$ is held down in place and guided by means of bearing-pieces $F^1$ $F^1$, to the upper ends of which upright hand-levers F F are pivoted the lower ends of which are attached loosely to the said slide $F^2$, so that by vibrating either one of said levers F, the gear-wheels $O^1$ $O^2$ can be moved endwise, whether their axle $r^1$ be rotating or at rest.

For the purpose of locking the slide $F^2$, and its attachment, in any desired position, I use a rocking-bar, F³, having a tooth, j, upon its edge, which tooth is adapted to enter one of these notches i i i, made in the edge of the slide F².

The rocking bar has its end bearings in the pieces F¹ F¹, and the handles G G are affixed to its extremities, for rocking it.

Between the two bevel-wheels O¹ O² is a bevel-pinion, e, which is keyed on the rear end of a shaft, e¹, which extends forward and upward, to a point near the front end of the machine, and is supported in suitable bearings e³ A³.

This shaft e¹ carries on its front end a spur-wheel, D³, which receives rotation from a worm-screw, D², upon a crank-shaft, D¹, which extends transversely across the bed A, and is supported in bearings upon standards C C C¹, that are secured firmly to the top of this bed A.

The crank-shaft D¹ carries balance-wheels D D upon its extremities, and to the crank D⁴ of this shaft, between the standards C C¹, a pitman-rod is connected, which receives motion from the piston of an engine, A.

The engine A⁴, boiler A², feed-pump, steam-pipes, and appurtenances, are all mounted upon, and suitably secured down to the carriage-bed A, so as to move with it; and said engine, boiler, and feed-pump, may be constructed in the usual, or any other suitable well-known manner.

The drawings represent a horizontal engine and horizontal boiler, but I do not confine my invention to this form or kind of engine and boiler, as other forms and kinds may be adopted.

On each side of the bed A, and rigidly secured thereto, is a vertical standard, B, which may be strengthened by means of braces B¹ and B², and which is perpendicular to the plane of the bed A, as shown in fig. 2.

Each one of these standards B is constructed with its lower end forked, and the edges of its upper portion parallel to each other, so as to afford guides for blocks, between which the chisels or cutters are confined.

Hitherto I have used, for each gang of cutters, two guide-plates or standards, one of which was secured rigidly to the side of the carriage-bed, and the other was hinged to the fixed one.

I now dispense with the hinged standards, and so construct a single standard that it affords a good bearing and guide for the chisel or cutter-boxes, and does not occupy as much space laterally as the double standards, thereby allowing the machine to be run much closer to a bank than under the old arrangement.

Each gang of cutters, X X X X, is confined between plates Q R near their upper ends, and plates O P near their lower ends.

To prevent the cutters or chisels from slipping between said pairs of plates, I form serrations upon the inner surface of one plate of each top pair, as shown in fig. 14, which fit into corresponding serrations formed on the chisels X, as shown in fig. 17.

Both pair of plates are bolted together by transverse bolts, which also serve to secure in place the plates S R, that have their ends rabbeted, to receive the edges of the standard B, as shown in figs. 3, 6, and 15.

To the rabbeted plate V of each gang of chisels X X, a box, b¹, is applied in a suitable manner, and adapted for receiving loosely the ends of links b b, which are attached to the lower notched ends of arms H H, that form a pitman-connection between the plate V of each gang of chisels and the wrist-pin h², on face of the balance-wheel D on the crank-shaft, as shown in figs. 2, 7, 8, and 10.

One of the arms H of each connection is pivoted directly to the wrist-pin h², and the other arm H is pivoted to this arm at y. Thus the lower ends of the two arms H H may be extended or brought together like a pair of tongues.

At the crotch, between each pair of arms H H, a spring, h, of rubber or other suitable material, is confined in a suitable manner, for the purpose of preventing shocks and concussions being communicated to the wrist-pin h², and other parts of the machine, from either gang of chisels, during the operation of cutting channels in stone.

The wrist-pin h² of each pair of arms H H is applied to a plate, E, which is pivoted, at t, to the face of the balance wheel D, and again connected, at t¹, to said plate by means of a screw.

Several screw-holes, t², are made through the balance-wheel D of each gang of cutters, for receiving the screw-fastening t¹, and allowing the wrist-pin h², with its plate E, to be adjusted nearer to or farther from the axis of the crank-shaft D¹, according to the length and force of stroke required to give the said cutters, or chisels.

If the wrist-pin h² is thus adjusted, so that its axis coincides with the axis of the crank-shaft, it is obvious that there will be no motion communicated to the chisels of such wrist-pins. Consequently this affords a ready means for stopping the motion of one gang of chisels when it is desired to cut but one channel at a time.

In fig. 10, plate 4, the red lines indicate the wrist-pin h² adjusted so as to coincide with the axis of the crank shaft, and in figs. 7 and 8, on the same plate, the wrist-pin is indicated in a position, with respect to the axis of the crank-shaft, for giving the greatest length of stroke to a gang of chisels or cutters.

Instead of having the wrist-pin affixed to a plate, E, which is adjustable in the arc of a circle, the wrist-pin may be affixed to a rectilinear plate, E×, as shown in fig. 11, which plate is constructed with a tenon, that fits into a radial groove made in the face of the balance-wheel, and is secured in place, after adjustment, by means of screws or other means.

I do not confine my invention to the precise construction and arrangement as herein shown of the movable plate for adjusting the wrist-pin h² nearer to or further from the axis of its balance-wheel, for shortening or lengthening the strokes of the chisels or cutters, as other means equivalent thereto may be adopted.

When two gangs of chisels are used, as shown in figs. 2 and 3, and driven from the same crank-shaft, the wrist-pins h² will be arranged on opposite sides of the axis of the shaft, so that they will cause the two gangs to strike alternately, in the operation of channelling.

It will be seen, by references to figs. 3, 9, 6, and 15, that each gang of chisels is composed of a number of narrow bars, with chisel-edges, and confined securely together, as a single plate, by means of the two pairs of clamping-plates, above described, and it will also be seen that each pair of said clamping-plates is "half slotted," so that they meet in a plane, passing centrally through the gang. Thus when wedges o are driven between said plates, to clamp the chisels edgewise, there will be no tendency to spread these plates apart.

The operation of the machine is as follows:

The rail-track is suitably adjusted upon the bed of the quarry upon the stone which it is desired to channel, and the machine mounted thereon, and motion is imparted to the crank-shaft D¹ by admitting steam to the engine.

In the drawings, the wrist-pin h² on each balance-wheel D, with its plate E, is supposed to be adjusted for giving the greatest length of stroke, and the motion of the main crank-shaft, with its balance-wheels D D, is supposed to be in the direction indicated by the arrows in figs. 1, 7, and 8.

The attendant then engages one or the other of the wheels $O^1$ $O^2$ with the pinions $e$ on shaft $e$, according as he may desire the machine to move forward or backward, and the work of channelling instantly commences.

The motion of the two gangs of chisels is stopped by cutting off the communication between the boiler and engine, and the advancing or retreating movements of the chisels and carriage can be stopped by adjusting the wheels $O^1$ $O^2$ so that neither one will engage with the wheel $e$.

The points of the cutters are supposed to rest on the stone bed or material to be channelled when the wrist-pin $h^2$ is at the point directly under the centre of the crank-shaft, as shown in fig. 8, while the links $b\ b$ occupy a position nearly in a line with each other.

When the wrist-pin has travelled one-quarter of a revolution, (see fig. 10,) the weight of the gang of cutters causes said links to change their position in relation to each other, by drawing their inner ends downward, and at the same time causing the lower end of the arms H H to approach each other, by which the spring $h$ is compressed, thereby gradually overcoming the inertia of the said cutters, without subjecting the wrist-pin $h^2$ and other points of connection to sudden strain and shock.

Should the wrist-pin receive a velocity less than that of the gravitating movements of the cutters, the links would be in position relative to each other from the time they were lifted from the material to be cut until they had returned to the same, and the points of the cutters would not strike the material to be cut with any great degree of force, as they would be arrested in their downward strokes by the wrist-pin. Therefore, in order to cause the gang of cutters to strike with greater force, it is necessary that the wrist-pin should have a velocity greater than the gravitating movements of the cutters, in which case the position of the links $b\ b$ during the downward strokes will be reversed, and their inner ends will be highest, as shown in fig. 7 in black lines.

The levers, descending faster than the gang of cutters, are relieved of weight, and the lower ends of these arms H H are forced apart by the rubber spring between them, and the inner ends of the links $b\ b$ assume their highest position, by which the lower ends of the arms H H are again drawn toward each other, and the spring compressed between them without producing any strain or shock.

The flexibility of the link-connections and the elasticity of the spring between the arms H H prevent the jar incident to the striking of the cutters upon the stone from being communicated to the wrist-pin and other parts of the machine. Both sides of the machine are constructed alike, with the wrist-pin so adjusted as to cause the stroke of the cutters to be given alternately.

When the machine has moved upon its track as far as may be required to make one or two channels, the attendant reverses the position of the levers F, and thus disengages one of the spur-wheels $O^1$ from its pinion $e$, and engages the other wheel, $O^2$, with this wheel. And when it is desired to stop the forward or backward movements of the machine, for supplying the boiler with water, or for other reasons, the levers F are adjusted so that neither of the said spur-wheels will engage with the bevel-pinion $e$.

On the inner side of each plate O, horizontal serrations are made, for receiving the corresponding serrations on the plate V when the plate is bolted in place, as shown in fig. 6. This mode of connecting the plates is very important, as it prevents their displacement, and also relieves the bolts which connect them together from transverse strain.

I do not claim, under this patent, the broad invention of preventing shocks or recoils of the chisels upon the engine employed for operating them by means of a spring-cushion; but What I do claim as my invention, and desire to secure by Letters Patent, is—

1. The arms H H, links $b\ b$, and spring $h$, or their equivalents, constructed, applied, and operating substantially as and for the purpose herein specified.

2. The combination of reciprocating gangs of channelling, or quarrying-chisels, applied to opposite sides of the carriage-bed A, a crank-shaft, the yielding connecting-devices H H, $b\ b$, and $h$, and the engine mounted upon the carriage-bed A, all substantially as herein specified.

3. The forked standard-guide or guides B, applied to a stone-chambering machine, and adapted to serve as guides for the chisels, substantially as described.

4. In combination with a reciprocating gang of stone-channelling chisels, guided and supported substantially as described, the adjustable plate, carrying the wrist-pin $h^2$, substantially as herein specified.

5. The combination of the crank-shaft D, gangs of chisels, carriage of the machine, worm-screw $D^2$, spur-wheel $D^3$, longitudinal shaft $e^1$, spur-wheel $e$, shifting gearing $O^1$ $O^2$, axle $r$, and transporting-wheels $S^1$, substantially as herein specified.

6. The shifting gearing $O^1$ $O^2$, slide $F^2$, and locking-bar $F^3$, applied to a stone-channelling machine, and adapted to operate substantially as and for the purposes described.

7. The plates V O, connected together by means of bolts and interlocking horizontal serrations, in combination with plate P, substantially as and for the purpose described.

GEO. J. WARDWELL.

Witnesses:
 O. CLARK,
 GEO. E. ROYCE.